United States Patent [19]

Shkedi

[11] Patent Number: 4,689,999
[45] Date of Patent: Sep. 1, 1987

[54] TEMPERATURE COMPENSATED PRESSURE TRANSDUCER

[75] Inventor: Zvi Shkedi, Los Angeles, Calif.

[73] Assignee: The Garrett Corporation, Los Angeles, Calif.

[21] Appl. No.: 759,626

[22] Filed: Jul. 26, 1985

[51] Int. Cl.⁴ .......................... G01L 7/08; G01L 9/12; G01L 19/04

[52] U.S. Cl. ........................................ 73/708; 73/718; 73/724; 361/283

[58] Field of Search .................... 73/724, 718, 708; 361/283

[56] References Cited

U.S. PATENT DOCUMENTS

| | | | |
|---|---|---|---|
| 2,080,429 | 5/1937 | McNally | 361/283 |
| 3,314,493 | 4/1967 | Kennedy | 361/283 |
| 4,301,492 | 11/1981 | Paquin et al. | 361/283 |
| 4,422,335 | 12/1983 | Ohnesorge et al. | 73/724 |
| 4,507,973 | 3/1985 | Barr et al. | 73/724 |
| 4,545,254 | 10/1985 | Lawless et al. | 361/283 |

Primary Examiner—Donald O. Woodiel
Attorney, Agent, or Firm—Leslie S. Miller; Albert J. Miller

[57] ABSTRACT

A quartz pressure transducer is disclosed which includes four or five elements, three of which are diaphragms containing deposited metal electrodes on both sides thereof. Since the electrodes are all on the diaphragms, the transducer disclosed herein is highly resistant to errors caused by changes in temperature, while retaining excellent resistance to errors caused by acceleration or vibration forces. The transducer may be constructed as either an absolute pressure sensor or as a differential pressure sensor, and in the primary embodiment contains a reference capacitance which may be used by appropriate electronic circuitry to provide compensation for acceleration or vibration forces, making the output of the pressure transducer of the present invention a highly accurate, highly sensitive indication of pressure sensed.

31 Claims, 4 Drawing Figures

TEMPERATURE COMPENSATED PRESSURE TRANSDUCER

BACKGROUND OF THE INVENTION

1. Field of the Invention

The present invention relates generally to quartz pressure transducers for providing a variable output capacitance indicative of variable pneumatic pressure acting on the transducer, and more particularly to an improved pressure transducer having great resistance to temperature error while providing a highly accurate indication of pressure supplied to the transducer.

2. History of the Art

Quartz pressure transducers have been used for some time in the avionics field to convert a number of difference sampled pressures to electronic signals which may be analyzed to provide information about aircraft altitude, mach number, indicated airspeed, angle of attack, and slip or yaw angle. Since information on both military and commercial aircraft must be highly accurate, pressure transducers must be highly reliable and relatively immune from noise which may be caused by acceleration, turbulence, and temperature.

A system for measuring such pressures has three basic components, the first of which is a pitot tube which measures an air pressure at a location on the exterior of the aircraft, and has a pneumatic line leading from the pitot tube to the interior of the aircraft. The second component in the pressure measurement apparatus is the transducer which converts pressure into an electrical signal, with a typical transducer being of a fused quartz type such as that shown in U.S. Pat. No. 3,962,921, to Lips. Finally, the third component of the system is electronic circuitry which has as an input the variable capacitance from the quartz pressure transducer. Such circuitry is shown in U.S. Pat. No. 3,790,910, to McCormack.

Although several configurations of quartz pressure transducers are available, virtually all the designs are similar to the Lips patent design, and utilize two diaphragms with substantially equal natural frequencies, with the diaphragms being superposed for movement in phase and in unison under accelerating forces to minimize the effect of acceleration and vibration on the sensor. Ceramic and metallic transducers have also been made using the same principles as fused quartz transducers, and it should be understood that the principles of the invention disclosed herein may also be applicable to such transducers. More recently, a three element transducer has been manufactured by the assignee of the present application. By utilizing three elements, two sets of capacitor electrodes may be arranged, with one of the sets of capacitor electrodes being responsive to changes in pressure, and the other set of capacitor electrodes being immune to changes in pressure. Since both sets of capacitor electrodes are equally responsive to acceleration or vibration, the circuitry for the transducer may be so arranged and configured as to reduce the sensitivity of the assembly to acceleration and vibration error. This approach, while providing some degree of improvement in reduced sensitivity to acceleration and vibration, has not resulted in a reduction of error caused by temperature variation.

Stated succinctly, there are two causes of temperature error in quartz pressure transducers—thermal curvature of quartz diaphragms due to the presence of an electrode on only one side of the diaphragm, and differing physical charactercs of the capacitor elements used in the pressure transducer. It is readily apparent that if only one side of a quartz diaphragm is plated with a deposited metal electrode, that diaphragm will bend slightly when subjected to temperature variation, in a manner similar to a bimetallic strip. Even more importantly, if one of the elements of the transducer is thicker than another, it is readily apparent that physical change with differing temperatures will not be consistent with the thinner element. Therefore, it is apparent that a need exists for a pressure transducer which will have substantially greater immunity to temperature variations. It is desirable that the improved transducer be so free of temperature error as to greatly reduce the requirement for temperature compensation in the electronic circuitry accompanying the transducer.

While the improved transducer has substantially increased immunity to temperature variation, it must also retain a high degree of immunity to vibration and acceleration forces. All of these desirable effects must be accomplished without degraduation or desensitization of the output of the pressure transducer. Finally, it is desirable that the improved transducer be adaptable for use both to sense absolute pressure and also to a differential pressure, whereby the transducer will detect the difference between two pressures applied to it.

SUMMARY OF THE INVENTION

The present invention in its basic embodiment includes four elements, three of which are diaphragms carrying electrodes used in pairs to form capacitors. One of the three diaphragms is sensitive to pressures supplied to the pressure transducer. The pressure transducer of the present invention may either sense absolute pressure, which is supplied with a single pressure input, or sense a differential pressure, which is supplied with two pressures and determines the difference between the two pressures.

The remaining two diaphragms are reference diaphragms, which are used in the pressure transducer to eliminate errors due to acceleration or vibration encountered by the pressure transducer during operation. Since all three diaphragms will be subject to the same acceleration and vibration forces, and since all three diaphragms are superposed for movement in phase and in unison under such forces, electrical measurements can be taken from the diaphragms which are responsive to pressure variations independent of movement of the diaphragms caused by acceleration and vibration forces.

Since the pressure transducer of the present invention has two capacitances as an output, one of the capacitances is responsive to pressure and the other is a reference capacitance. By analyzing the change in reference capacitance and subtracting an appropriate electrical signal from the signal generated by the pressure sensitive capacitance, an accurate reading of capacitance change due to pressure alone may be determined.

In addition, the pressure transducer of the present invention is much less susceptible to error caused by temperature changes because of a design feature of the transducer not previously known in the art. The deposited metal electrodes are deposited only on the diaphragms and are not deposited on the housing, which is thicker than the diaphragms. The reason for this is that the greatest amount of temperature error in transducers is caused by unequal response to temperature change of an electrode deposited on a diaphragm and an electrode deposited on the housing. The present invention is the first transducer designed to overcome this problem.

In an alternate embodiment, five elements are used, with the additional element being an additional housing portion which may be desired in certain applications of the transducer. Additionally, two diaphragm configurations are disclosed, one of which has the pressure sensitive diaphragm located between two reference diaphragms, the other of which has the pressure sensitive diaphragm located next to two adjacent referenced diaphragms.

Accordingly, it may be perceived that a pressure transducer constructed according to the teachings of the present invention will not only have substantially better immunity to acceleration and vibration forces, but will also be immune to error induced by temperature change during operation of the transducer. The pressure transducer of the present invention is adaptable to use both to sense absolute pressure and to sense differential pressure. It may also be used in a two housing configuration, the first of which has a housing portion located only on one side of the diaphragms, and the second of which has a housing portion located on both sides of the diaphragms. The present invention is therefore a highly accurate, highly sensitive pressure transducer providing the above significant advantages without substantial disadvantage.

DESCRIPTION OF THE DRAWINGS

These and other advantages of the present invention are best understood with reference to the drawings, in which.

DETAILED DESCRIPTION OF THE PREFERRED EMBODIMENT

Figure 1:
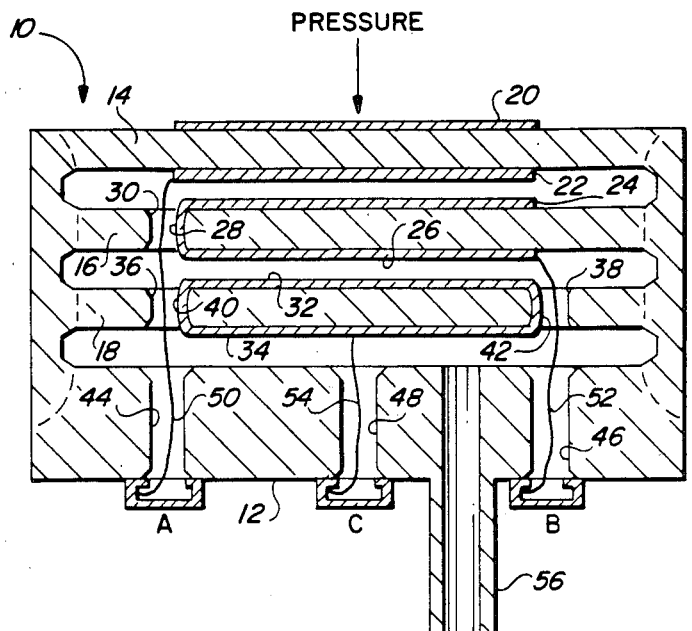
FIG. 1 is a cross-sectional view of a transducer constructed according to the teachings of the present invention and having one housing portion, with the pressure sensitive diaphragms located adjacent to the two reference diaphragm.
Figure 2:
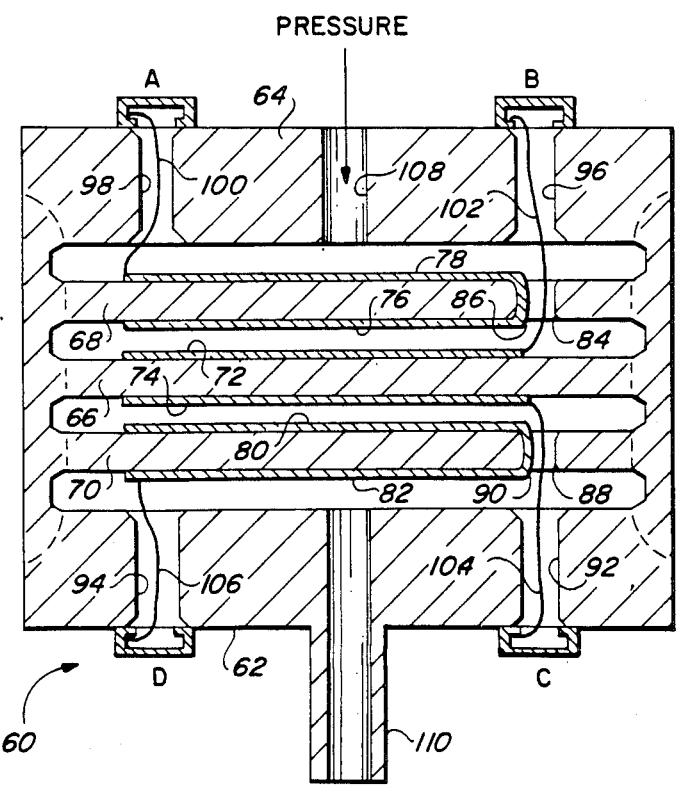
FIG. 2 is a cross-sectional of view of an alternate embodiment of the present invention illustrating a pressure transducer having two housing portions and having the pressure sensitive diaphragm mounted between the two reference diaphragms.

The pressure transducers illustrated in FIGS. 1 and 2 are preferably constructed of quartz or silica glass, and consist of three thin diaphragms with either one or two housing sections. In the past, diaphragms and housing sections were secured together by a bonding cement to provide a substantially leak-proof seal against loss of fluid pressure applied to the transducer, but in the preferred embodiment they are fused together in order to provide a more uniform and permanent bond between the various diaphragms and housing sections.

In FIG. 1, a tranducer 10 is illustrated which is comprised of a housing portion 12, a pressure sensitive diaphragm 14, and two reference diaphragms 16, 18. In the embodiment shown in FIG. 1, the pressure sensitive diaphragm 14 is adjacent the two reference diaphragms 16, 18 rather disposed between the two reference diaphragms 16, 18. The reference diaphragms 16, 18 are disposed between the pressure sensitive diaphragm 14 and the housing section 12.

For convenient fabrication it is preferable that the pressure sensitive diaphragm 14, the reference diaphragms 16, 18, and the housing section 12 be discs of circular configuration, although it will be apparent to those skilled in the art that such circular configuration is not an absolute requirement for practicing the present invention. Also, the pressure sensitive diaphragm 14 and the reference diaphragms 16, 18, are relatively thin in comparison with their diameters, thereby making the diaphragms more subject to vibration in a first mode as compared with any other exciting frequency that the transducer 10 will be subjected to. Therefore, the pressure diaphragm 14 and the reference diaphragms 16, 18 will move in phase and in unison whenever the transducer 10 is subjected to accelerating or vibratory forces.

The pressure sensitive diaphragm 14 and the reference diaphragms 16, 18, each have metal electrodes deposited on both sides thereof in a configuration which is preferably circular, and does not extend to the edges of the diaphragms. It is apparent that the deposited metal electrodes are formed prior to construction of the transducer 10 by the bonding or fusing operations described above. The fused area is shown in dotted lines in FIG. 1. The metal electrodes are made from a noble metal such as gold which may be deposited on the diaphragms easily.

The pressure sensitive diaphragm 14 has an electrode 20 on the side of the pressure sensitive diaphragm 14 facing away from the reference diaphragm 16, and a second deposited metal electrode 22 on side of the pressure sensitive diaphragm 14 facing the reference diaphragm 16. The deposited metal electrode 20 on the pressure sensitive diaphragm 14 will not be used to form a capacitor, but is deposited on the surface of the pressure sensitive diaphragm 14 to ensure that the pressure sensitive diaphragm 14 will not bend when subjected to heating or cooling due to unequal expansion, as is the case where a diaphragm has an electrode deposited only on one side thereof.

The reference diaphragm 16 has a deposited metal electrode 24 on the side of the reference diaphragm 16 facing the pressure sensitive diaphragm 14, and an electrode 26 on the side of the reference diaphragm 16 facing away from the pressure sensitive diaphragm 14. Unlike the electrodes 20, 22 on the pressure sensitive diaphragm 14, the electrodes 24, 26 on the reference diaphragm 16 are connected together by conductor means 28 extending through a passageway 30 in the reference diaphragm 16. The passageway 30 in the diaphragm 16 is relatively small, but allows for a thin wire to extend through the aperture 30 without touching the conductor means 28. The thin wire will be discussed in detail below.

The reference diaphragm 18 has a deposited metal electrode 32 on the side of the reference diaphragm 18 facing the reference diaphragm 16, and a second deposited metal electrode 34 on the side of the reference diaphragm 18 away from the reference diaphragm 16. Similar to the reference diaphragm 16, the reference diaphragm 18 has two passageways 36, 38, extending therethrough. The passageway 36 is linear with the passageway 30 extending through reference diaphragm 16. The deposited metal electrodes 32, 34 on the reference diaphragm 18 are connected by a conductor means 40 extending through the passageway 36 and a conductor means 42 extending through the passageway 38.

The housing portion 12 is located adjacent the side of the reference diaphragm 18 facing away from the reference diaphragm 16. The housing portion 12 has a passageway 44 therethrough which is linear with the passageway 36 in the reference diaphragm 18 and the passageway 30 in the reference diaphragm 16. The housing portion has a second passageway 46 which is linear with the passageway 38 extending through the reference diaphragm 18. The housing portion 12 has a third passageway 48 which is above a portion of the deposited metal electrode 34 having no aperture or passageway nearby in the reference diaphragm 18.

A thin conducting wire 50 extends through the passageways 44, 36, and 30 contained in the housing portion 12, the reference diaphragm 18, and the reference diaphragm 16, respectively, and leads to the deposited metal electrode 22 on the side of the pressure sensitive diaphragm 14 facing the reference diaphragm 16. The other end of the conducting wire 50 is connected to a terminal A mounted on the side of the housing portion 12 away from the reference diaphragm 18. A second conducting wire 52 extends through the passageway 46 and the passageway 38 contained in the housing portion 12 and the reference diaphragm 18, respectively, and leads to the deposited metal electrode 26 on the reference diaphragm 16. The other end of the conducting wire 52 is connected to a terminal B mounted on the side of the housing portion 12 away from the reference diaphragm 18. A third conducting wire 54 extends through the passageway 48 in the housing portion 12 and is connected at one end to the deposited metal electrode 34 on the reference diaphragm 18 and at the other end to a terminal C mounted on the side of the housing portion 12 away from the reference diaphragm 18. It should be noted that the conducting wires 50, 52, and 54 are extremely fine wire, and in no way interfere with movement of the pressure sensitive diaphragm 14 or the reference diaphragms 16, 18. The terminals A, B, and C are sealed to the housing portion 12.

The housing portion 12 includes a seal-off tube 56 having an aperture which extends through the housing portion 12 into the chamber between the pressure sensitive diaphragm 14, the reference diaphragms 16, 18, and the housing portion 12. For an absolute sensor, pressure will be applied to the side of the pressure sensitive diaphragm 14 containing the deposited metal electrode 20, and the chamber hereinabove described will be evacuated and the seal-off tube 56 will be sealed. For construction of a differential sensor, pressure will apply as above to the side of the pressure sensitive diaphragm 14 containing the deposited metal electrode 20, and a second pressure will be applied to the transducer 10 through the seal-off tube 56.

Figure 1A:
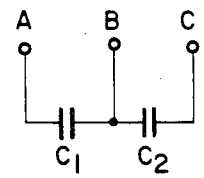
FIG. 1A is the equivalent electrical schematic of the transducer shown in FIG. 1.

In FIG. 1A the electrical equivalent of the transducer 10 in FIG. 1 is illustrated. Two capacitances are formed, the first being capacitance $C_1$ which is between terminals A and B, and the second capacitance $C_2$ which is located between the terminals B and C. The capacitors $C_1$ and $C_2$ of the transducer 10 shown in FIG. 1 are so connected as to share a common terminal, namely terminal B.

Due to the design of the transducer 10 shown in FIG. 1, the capacitance $C_1$ will change as pressure is applied to the transducer 10, and of course will also change as the transducer 10 is subjected to acceleration or vibration forces. For example, as pressure applied to the transducer 10 increases, the pressure sensitive diaphragm 14 will move towards the reference diaphragm 16, causing capacitance $C_1$ to increase. The capacitance $C_2$ will not change as pressure is applied to transducer 10, but will change as the transducer 10 is subjected to acceleration or vibration forces. Therefore, it is apparent that the capacitor $C_2$ may be used by circuitry accompanying the transducer of the present invention in order to compensate for error caused by acceleration or vibration in the change of capacitance of the capacitor $C_1$, and the output of the system may be thus compensated to eliminate any sensitivity to errors caused by acceleration or vibration forces. Additionally, since each of the diaphragms in the transducer 10 have electrodes deposited on both sides thereof, and since the electrodes used to form capacitors are deposited only on diaphragms and not on the housing portion 12, the transducer 10 will be substantially less subject to error due to change in temperature of the transducer 10. This represents a substantial step in the art, since the circuitry accompanying the transducer 10 needs far less compensation for temperature error.

In FIG. 2, a transducer 60 is illustrated which is constructed in a manner similar to the transducer 10 shown in FIG. 1. The transducer 60 of FIG. 2 has two differences, the first is that the transducer 60 of FIG. 2 has a first housing portion 62 and second housing portion 64. The second difference of the transducer 60 shown in FIG. 2 from the transducer 10 shown in FIG. 1 is that a pressure sensitive diaphragm 66 is mounted between a reference diaphragm 68 and a second reference diaphragm 70. The transducer 60 shown in FIG. 2 is also preferably constructed by fusing the assembly including the housing portions of 62, 64 and the pressure sensitive diaphragm 66 and the reference diaphragms 68, 70 together to form a single unitary assembly, with the fused portion being shown in dotted lines.

The pressure sensitive diaphragm 66 has a deposited metal electrode 72 on the side of the pressure sensitive diaphragm 66 facing the reference diaphragm 68, and a second deposited metal electrode 74 on the side of the pressure sensitive diaphragm 66 facing the other reference diaphragm 70. The reference diaphragm 68 has a deposited metal electrode 76 on the side of the reference diaphragm 68 facing the pressure sensitive diaphragm 66, and a second deposited metal electrode 78 on the side of the reference diaphragm 68 facing the second housing portion 64. The reference diaphragm 70 has a deposited metal electrode 80 on the side of the reference diaphragm 70 facing the pressure sensitive diaphragm 66, and a second deposited metal electrode 82 on the side of the reference diaphragm 70 facing the housing portion 62.

The reference diaphragm 68 has a passageway 84 therethrough, which passageway 84 has a conductor means 86 extending therethrough to connect the deposited metal electrodes 76, 78 on the two opposing sides of the reference diaphragm 68. The passageway 84 through the reference diaphragm 68 is of sufficient diameter to allow a wire to extend therethrough without touching the conducting means 86. Likewise, the reference diaphragm 70 has a passageway 88 therethrough, with passageway 88 having a conductor means 90 therethrough connecting the deposited metal electrodes 80, 82 on the opposite sides the reference diaphragm 70.

The first housing portion 62 has a passageway 92 therethrough which passageway is located in a linear manner with the passageway 88 through the reference diaphragm 70. The housing portion 62 has a second passageway 94 extending therethrough above a portion of the deposited metal electrode 82 on the reference diaphragm 70.

The second housing portion 64 has a passageway 96 therethrough which is linear with the passageway 84 contained in the reference diaphragm 68. The second housing portion 64 has a second passageway 98 therethrough which extends toward the deposited metal electrode 78 on the reference diaphragm 68.

A thin conductive wire 100 extends through passageway 98 in the second housing portion 64 from the deposited metal electrode 78 on the reference diaphragm 68 to a terminal A mounted on the outside of the second housing portion 64. A wire 102 extends through the passageway 96 in the second housing portion 64 and through the passageway 84 in the reference diaphragm 68, with the wire 102 leading from the deposited metal electrode 72 on the pressure sensitive diaphragm 66 to a terminal B mounted on the exterior of the second housing portion 64.

Likewise, a third wire 104 extends through the passageway 92 in the first housing portion 62 and the passageway 88 in the reference diaphragm 70, and the wire 104 leads from the deposited metal electrode 74 on the pressure sensitive diaphragm 66 to a terminal C mounted on the exterior of the first housing portion 62. Finally, a fourth wire 106 extends through the passageway 94 in the first housing portion 62 and leads from the deposited metal electrode 82 on the reference diaphragm 70 to a terminal D mounted on the exterior of the first housing portion 62. As is the case with the transducer 10 shown in FIG. 1, the terminals on the transducer 60 in FIG. 2 are sealed to the housing portions.

Pressure is applied to the transducer 60 through an aperture 108 contained in the second housing portion 64, which pressure will be in the chamber comprising the areas between the second housing portion 64, the reference diaphragm 68, and the pressure sensitive diaphragm 66. To sense an absolute pressure, a sealed-off tube 110 having an aperture extending through the first housing portion 62 would be sealed after a vacuum is drawn in the chamber comprised of the areas between the pressure sensitive diaphragm 66, the reference diaphragm 70, and the first housing portion 62. To sense a differential pressure, a second pressure would be supplied to the seal-off tube 110, and would therefore be applied to the area above described.

Figure 2A:
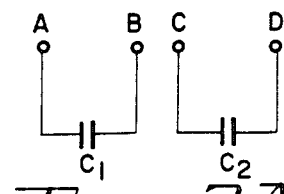
FIG. 2A is the equivalent electrical schematic of the transducer shown in FIG. 2.

FIG. 2A illustrates the electrical schematic of the capacitors formed by the transducer 60 shown in FIG. 2 with a first capacitance $C_1$ being between terminals A and B, and a second capacitance $C_2$ being between terminals C and D. In the transducer shown in FIG. 2, the capacitors $C_1$ and $C_2$ are not connected together.

Since the pressure sensitive diaphragm 66 is located between the reference diaphragms 68, 70, it is apparent that both $C_1$ and $C_2$ will change as pressure supplied to the transducer 60 changes. As pressure increases, it is apparent that $C_2$ will increase and $C_1$ will decrease due to movement of the pressure sensitive diaphragm 66 towards the reference diaphragm 70 and away from the reference diaphragm 68.

In both the embodiments shown in FIGS. 1 and 2, the output circuitry would then use either the ratio on the difference of $C_1$ and $C_2$ to determine pressure sensed, with compensation for acceleration and vibration errors being inherently included in the sensor design of FIG. 2 also since the pressure sensing diaphragm 66 and both reference diaphragms 68, 70 are subjected to the same forces.

It is therefore apparent that the embodiment shown in FIG. 2 has three differences from the embodiment shown in FIG. 1, namely first that the pressure sensitive diaphragm in FIG. 2 is between the two reference diaphragms rather than adjacent the diaphragms as in FIG. 1. The second difference is that the transducer 60 in FIG. 2 has a fifth element which is the second housing portion 64, which element may be mandated by certain transducer design requirements. Thirdly, both capacitances $C_1$ and $C_2$ vary as pressure changes. It is important to note that the transducer of FIG. 1 could also include a second housing portion 64, if it were desired to effect the capacitor arrangement of FIG. 1 with the second housing portion.

The transducer 60 of FIG. 2 shares the same advantages of the transducer 10 of FIG. 1, namely an immunity to errors caused by temperature in addition to immunity to errors caused by acceleration or vibration forces. It may therefore be appreciated that the transducers disclosed herein posesses significant advantages over the art and that they are not only highly accurate and highly sensitive, but immune to error caused by temperature variation, unlike transducers previously known in the art. Since the transducers of the present invention may be constructed easily using existing technology at relatively little extra cost, it may be appreciated that they are a highly desirable avionic component.

What is claimed is:

1. A pressure transducer comprising:
    a housing portion;
    a first diaphragm having a first electrode on one side thereof and a second electrode on the other side thereof, said first diaphragm being located adjacent to and spaced apart from said housing portion with said first electrode facing said housing portion and said second electrode facing away from said housing portion;
    a second diaphragm having a third electrode on one side thereof and a fourth electrode on the other side thereof, said second diaphragm being located adjacent to and spaced apart from said first diaphragm with the side of said second diaphragm having said third electrode thereon facing the side of said first diaphragm having said second electrode thereon;
    a third diaphragm having a fifth electrode on one side thereof and a sixth electrode on the other side thereof, said third diaphragm being located adjacent to and spaced apart from said second diaphragm with the side of said third diaphragm having said fifth electrode thereon facing the side of said second diaphragm having said fourth electrode thereon, wherein a first capacitance $C_1$ is present across said fourth and fifth electrodes and a second capacitance $C_2$ is present across said second and third electrodes, and one of said first, second, and third diaphragms is responsive to a pressure input to cause a change in at least one of said first and second capacitances $C_1$ and $C_2$ as the pressure input changes.

2. A transducer as defined in claim 1, wherein said housing portion and said first, second, and third diaphragms are made of fused quartz.

3. A transducer as defined in claim 1, wherein said housing portion and said first, second, and third diaphragms are of generally circular configuration.

4. A transducer as defined in claim 3, wherein said housing portion and said first, second, and third diaphragms are fused together at the edges thereof to seal said transducer.

5. A transducer as defined in claim 1, wherein said first, second, third, fourth, fifth, and sixth electrodes each comprise:
a thin film of deposited noble metal.

6. A transducer as defined in claim 5, wherein said deposited noble metal is gold.

7. A transducer as defined in claim 1, wherein said one of said first, second, and third diaphragms responsive to the pressure input is said third diaphragm.

8. A transducer as defined in claim 7, wherein said first and second electrodes are electrically connected together and said third and fourth electrodes are electrically connected together.

9. A transducer as defined in claim 8, further comprising:
a first wire for connecting said fifth electrode to a first terminal on said housing portion, and first wire extending through a first passageway in said second diaphragm, a second passageway in said first diaphragm, and a third passageway in said housing portion;
a second wire for connecting said third electrode to a second terminal on said housing portion, said second wire extending through a fourth passageway in said first diaphragm and a fifth passageway in said housing portion; and
a third wire for connecting said first electrode to a third terminal on said housing portion, said third wire extending through a sixth passageway in said housing portion.

10. A transducer as defined in claim 9, wherein said first, second, and third terminals are sealed to said housing.

11. A transducer as defined in claim 9, wherein said first, second, and third wires are very fine to prevent any hinderence of the movement of said first, second, and third diaphragms.

12. A transducer as defined in claim 7, wherein only the first capacitance $C_1$ changes with a change in the input pressure.

13. A transducer as defined in claim 12, wherein the second capacitance $C_2$ may be used to provide compensation for errors caused by acceleration or vibration.

14. A transducer as defined in claim 1, additionally comprising:
an additional housing portion located adjacent to and spaced apart from said third diaphragm on the side of said third diaphragm having said sixth electrode thereon.

15. A transducer as defined in claim 14, wherein the one of said first, second, and third diaphragms responsive to the pressure input is said second diaphragm.

16. A transducer as defined in claim 15, wherein said first and second electrodes are electrically connected together and said fifth and sixth electrodes are electrically connected together.

17. A transducer as defined in claim 16, further comprising:
a first wire for connecting said sixth electrode to a first terminal on said additional housing portion, said first wire extending through a first passageway in said additional housing portion;
a second wire for connecting said fourth electrode to a second terminal on said additional housing portion, said second wire extending through a second passageway in said third diaphragm and a third passageway in said additional housing portion;
a third wire for connecting said third electrode to a third terminal on said housing portion, said third wire extending through a fourth passageway in said first diaphragm and a fifth passageway in said housing portion: and
a fourth wire for connecting said first electrode to a fourth terminal on said housing portion, said fourth wire extending through a sixth passageway in said housing.

18. A transducer as defined in claim 17, wherein said first and second terminals are sealed to said additional housing portion and said third and fourth terminals are sealed to said housing portion.

19. A transducer as defined in claim 17, wherein said first, second, third, and fourth wires are very fine to prevent any hinderance of the movement of said first, second, and third diaphragms.

20. A transducer as defined in claim 15, wherein one of said first and second capacitances $C_1$ and $C_2$ increases with an increase in the input pressure and the other of said first and second capacitances $C_1$ and $C_2$ decreases with an increase in the input pressure.

21. A transducer as defined in claim 1, wherein the elements of said transducer are so arranged and configured as to allow a value for pressure to be calculated as a function of the ratio of $C_1$ and $C_2$.

22. A transducer as defined in claim 1, wherein the elements of said transducer are so arranged and configured as to allow a value for pressure to be calculated as a function of the difference between $C_1$ and $C_2$.

23. A transducer as defined in claim 1, wherein a first pressure is supplied to one side of said one of said first, second, and third diaphragms which is responsive to the pressure input, and a second pressure is supplied to the other side of said one of said first, second, and third diaphragms which is responsive to the pressure input.

24. A pressure transducer comprising:
a housing portion;
a first diaphragm mounted adjacent to and spaced away from said housing portion;
a first electrode deposited on the side of said first diaphragm facing said housing portion;
a second electrode deposited on the side of said first diaphragm away from said housing portion;
a second diaphragm mounted adjacent to and spaced away from the side of said first diaphragm having said second electrode deposited thereon;
a third electrode deposited on the side of said second diaphragm facing said first diaphragm;
a fourth electrode deposited on the side of said second diaphragm away from said first diaphragm;
a third diaphragm mounted adjacent to and spaced away from the side of said second diaphragm having said fourth electrode deposited thereon;
a fifth electrode deposited on the side of said third diaphragm facing said second diaphragm; and
a sixth electrode deposited on the side of said third diaphragm away from said second diaphragm, the areas between the edges of said first, second, and third diaphragms and said housing portion being sealed, and a pressure input being applied across one of said first, second, and third diaphragms, a first capacitance being measureable across said fourth and fifth electrodes, a second capacitance being measureable across said second and third electrodes, said first and second capacitances being useable to determine the value of a pressure input.

25. A pressure transducer comprising:
a housing means;
first diaphragm means having a deposited electrode on each side thereof;
second diaphragm means having a deposited electrode on each side thereof;
third diaphragm means having a deposited electrode on each side thereof, said first, second, and third diaphragm means and said housing means being spaced narrowly apart, a pressure being applied to said third diaphragm; and
electrical conductor means for providing outputs from each of the pairs of deposited electrodes on facing sides of adjacent diaphragm means, the outputs being capacitive.

26. A method of converting a variable pressure input into a capacitive electrical output indicative of said variable pressure input, comprising:
providing a housing portion;
mounting a first diaphragm adjacent to and spaced away from said housing portion;
depositing a first electrode on the side of said first diaphragm facing said housing portion;
depositing a second electrode on the side of said first diaphragm away from said housing portion;
mounting a second diaphragm adjacent to and spaced away from the side of said first diaphragm having said second electrode deposited thereon;
depositing a third electrode on the side of said second diaphragm facing said first diaphragm;
depositing a fourth electrode on the side of said second diaphragm away from said first diaphragm;
mounting a third diaphragm adjacent to and spaced away from the side of said second diaphragm having said fourth electrode deposited theron;
depositing a fifth electrode on the side of said third diaphragm facing said second diaphragm;
depositing a sixth electrode on the side of said third diaphragm away from said second diaphragm;
sealing the areas between the edges of said first, second, and third diaphragms and said housing portion;
applying said variable pressure input across one of said first, second, and third diaphragms;
measuring a first capacitance across said fourth and fifth electrodes; and
measuring a second capacitances across said second and third elements, said first and second capacitances being useable to determine the value of said variable pressure input.

27. The method of claim 26 wherein the variable pressure input is applied across said third diaphragm.

28. The method of claim 26 wherein the variable pressure input is applied across said second diaphragm.

29. A capacitive pressure transducer comprising first, second and third diaphragms characterized in that said second diaphragm is between said first and third diaphragms and that each of said diaphragms has an electrically conductive layer electrode on each major surface thereof to provide a first capacitance between the first and second diaphragms and a second capacitance between the second and third diaphragms, one of said diaphragms mounted to respond to a pressure input to cause a change in at least one of said first and second capacitances in response to change in said pressure input.

30. A capacitive pressure transducer comprising:
a housing;
a first thin flexible flat circular disk reference diaphragm disposed within said housing;
a second thin flexible flat circular disk reference diaphragm disposed within said housing and spaced from said first reference diaphragm; and
a thin flexible flat circular disk pressure sensitive diaphragm disposed within said housing and spaced from said second reference diaphragm, each of said diaphragms having an electrically conductive layer deposited on the central portion of each flat surface thereof to establish a first capacitance between the first reference diaphragm and said second reference diaphragm and a second capacitance between said second reference diaphragm and said pressure sensitive diaphragm, the conductive layers not extending to said housing, said pressure sensitive diaphragm responsive to an applied pressure to cause a change in said second capacitance in response to a change in applied pressure.

31. A capacitive pressure transducer comprising:
a housing;
a first thin flexible flat circular disk reference diaphragm disposed within said housing;
a thin flexible flat circular disk pressure sensitive diaphragm disposed within said housing and spaced from said first reference diaphragm; and
a second thin flexible flat circular disk reference diaphragm disposed within said housing and spaced from said pressure sensitive diaphragm, each of said diaphragms having an electrically conductive layer deposited on the central portion of each flat surface thereof to establish a first capacitance between the first reference diaphragm and said pressure sensitive diaphragm and a second capacitance between said pressure sensitive diaphragm and said second reference diaphragm, the conductive layers not extending to said housing, said pressure sensitive diaphragm responsive to an applied pressure to cause a change in at least one of said first and second capacitances in response to a change in applied pressure.

* * * * *